United States Patent [19]

Maki

[11] Patent Number: 5,074,434

[45] Date of Patent: Dec. 24, 1991

[54] APPARATUS FOR DISPENSING DISK-SHAPED OBJECTS

[75] Inventor: Tadanori Maki, Ibaraki, Japan

[73] Assignee: Himecs Co., Ltd., Osaka, Japan

[21] Appl. No.: 614,716

[22] Filed: Nov. 16, 1990

[51] Int. Cl.[5] ............ B65G 59/00

[52] U.S. Cl. ............ 221/265; 221/277; 221/173

[58] Field of Search ............ 221/92, 156, 163, 172, 221/173, 252, 265, 266, 277, 311

[56] References Cited

U.S. PATENT DOCUMENTS

| | | | |
|---|---|---|---|
| 3,612,073 | 10/1971 | Calos | 221/265 |
| 4,392,505 | 7/1983 | Maloney et al. | 221/265 |
| 5,017,176 | 5/1991 | Swierezek | 221/265 |

FOREIGN PATENT DOCUMENTS

| | | |
|---|---|---|
| 3602291 | 7/1987 | Fed. Rep. of Germany . |
| 61-15292 | 1/1986 | Japan . |
| 2185341 | 7/1987 | United Kingdom . |

*Primary Examiner*—Robert P. Olszewski

*Assistant Examiner*—Kenneth Noland

*Attorney, Agent, or Firm*—Webb, Burden, Ziesenheim & Webb

[57] ABSTRACT

An apparatus for dispensing disk-shaped objects, comprises a hopper for storing a multiplicity of disk-shaped objects, a rotatable member mounted on a bottom of the hopper and defining a plurality of perforations or cutouts arranged peripherally thereof for receiving the disk-shaped objects, a support member rotatable with the rotatable member for supporting parts of the disk-shaped objects logged in the perforations or cutouts, and a guide device provided on the bottom of the hopper for radially outwardly guiding the disk-shaped objects lodged in the perforations or cutouts and transported with rotation of the rotatable member. The support member is disposed at a radially intermediate position in an annular moving range of the perforations or cutouts defined in the rotatable member. The guide device includes a plurality of guide pins arranged radially of the rotatable member, and within the annular moving range of the perforations or cutouts and at opposite positions across the support member.

7 Claims, 5 Drawing Sheets

APPARATUS FOR DISPENSING DISK-SHAPED OBJECTS

BACKGROUND OF THE INVENTION

1. Field of the Invention

This invention relates to an apparatus for dispensing disk-shaped objects such as medals. More particularly, the invention relates to an apparatus for dispensing disk-shaped objects, which comprises a rotatable member mounted in a bottom of a hopper capable of storing a multiplicity of disk-shaped objects, the rotatable member defining a plurality of perforations or cutouts arranged at appropriate intervals in the peripheral direction thereof and having a slightly larger diameter than the disk-shaped objects; a support member connected to the rotatable member to be rotatable together for supporting parts of the disk-shaped objects lodged in the perforations or cutouts of the rotatable member; and a guide device for transferring and guiding the disk-shaped objects pressed with rotation of the rotatable member from the perforations or cutouts outwardly of the rotatable member.

2. Description of the Prior Art

In the apparatus for dispensing disk-shaped objects as noted above, the disk-shaped objects lodged in the perforations or cutouts of the rotatable member are revolved as supported on the support member with rotation of the rotatable member. A clearance (slightly exceeding the thickness of one disk-shaped object) is intrinsically formed between the stationary bottom surface of the hopper and the back face of the rotatable member opposed thereto. When the rotatable member is rotated with the disk-shaped objects supported on the bottom surface of the hopper, for example, the rotatable member deflects to enlarge the clearance to an extent of accepting two disk-shaped objects. Other disk-shaped objects are positively prevented from wedging in inclined postures through the perforations into spaces between back surface of the rotatable member and upper surfaces of the disk-shaped objects lodged in the perforations because of this clearance.

As disclosed in the Japanese patent application laid open under No. 61-15292, such an apparatus for dispensing disk-shaped objects includes two types of support members having different diameters attached to the back surface of the rotatable member and exposed to the perforations or cutouts, one support member being outside the other in the direction of turning radius. A single extendible and retractable pin acting as a guide device is attached to the stationary bottom surface of the hopper to project from between the two support members when the rotatable member is rotatably attached to the bottom surface of the hopper.

The disk-shaped objects lodged in the perforations or cutouts of the rotatable member revolve, as supported by the inner and outer support members, with rotation of the rotatable member, and are pushed outwardly in the direction of turning radius through contact with the pin which is located in the path of revolution of the disk-shaped objects.

In the above prior construction, the disk-shaped objects moved by the rotatable member along the path of revolution are guided outwardly through contact with the single pin. In order to apply an outward driving force to the disk-shaped objects, therefore, the pin must be correctly set to a particular position slightly inwardly of the mid-point in the direction of turning radius within an annular range of movement of the perforations or cutouts of the rotatable member. For this reason, the entire apparatus must be manufactured with high precision. There is a further disadvantage that, with the single pin, the pressing action applied to the disk-shaped objects is nullified and the disk-shaped objects cannot be pushed outwardly of their path of revolution if the disk-shaped objects are even slightly displaced outwardly in the direction of turning radius from the locus of turning movement of the pin.

In order to move the disk-shaped objects outwardly in a reliable way, the bottom surface of the hopper and the rotatable member must be placed in an inclined posture so that the disk-shaped objects, after being pushed by the pin, slide under gravity toward an outlet for the disk-shaped objects which is located outwardly of the path of revolution. Further, the outlet must be formed at the lowermost position in the path of revolution of the disk-shaped objects. These requirements constitute an inconvenient designing restriction.

In order to overcome such an inconvenience, it is conceivable to arrange two pins in the direction of turning radius for pressing the disk-shaped objects, for example. In this case, however, the following disadvantage occurs since the two pins must be spaced a certain distance apart.

As shown in FIG. 16, two pins 15A and 15B are spaced a predetermined distance apart in the direction of turning radius on the hopper bottom 1A to reliably press disk-shaped objects M outwardly. This arrangement requires support members 14*a* and 14*b* for supporting the disk-shaped objects M to have very small disk-shaped object supporting areas. When the rotatable member 3 deflects in rotation and becomes inclined relative to the hopper bottom 1A, outer peripheries of the disk-shaped objects M may become disengaged from one of the support members 14*a*. As a result, the disk-shaped objects M may become caught between the hopper bottom 1A and the support member 14*a*. However, there is naturally a limitation to increase of the spacing between the two pins 15A and 15B, and the above-noted inconvenience cannot be overcome sufficiently.

SUMMARY OF THE INVENTION

An object of this invention is to provide an apparatus for dispensing disk-shaped objects, in which a support member is positioned relative to a rotatable member in a way to overcome the disadvantages of the prior art noted above.

The above object is fulfilled, according to this invention, by a construction in which the support member is disposed at a radially intermediate position in an annular moving range of the perforations or cutouts defined in the rotatable member, and the guide device includes a plurality of guides arranged in a direction of turning radius of the rotatable member, the guides being arranged within the annular moving range of the perforations or cutouts and at opposite sides in the direction of turning radius of the support member.

Preferably, the bottom of the hopper defines discharge openings arranged radially outwardly of the annular moving range of the perforations or cutouts for discharging foreign matters mixed with the disk-shaped objects.

The functions and advantages of this invention will be described next.

The feature that the support member is disposed at a radially intermediate position in the annular moving range of the perforations or cutouts defined in the rotatable member, allows a plurality of guides to be arranged at radially opposite positions across the support member. Consequently, a large spacing is secured between the guide disposed at one side radially of the support member and the guide disposed at the other side.

As shown in FIG. 6, for example, the support member 14 disposed as noted above stably supports the disk-shaped objects M in a fixed posture even if the rotatable member 3 deflects in its rotation and becomes inclined relative to the bottom 1A of the hopper and the disk-shaped objects M move in the perforations 3A. Thus, the disk-shaped objects M are prevented from becoming caught between the rotatable member 3 and the hopper bottom 1A as experienced in the prior art.

Further, the support member as disposed above allows the perforations or cutouts to include a clearance formed in a position thereof radially outwardly of the support member and extending to the hopper bottom. Therefore, the hopper bottom may define the above-mentioned discharge openings opposed to the clearance. This assures smooth discharge of not only foreign matters falling from the disk-shaped objects but those foreign matters moving radially outwardly under the centrifugal force produced by the rotation of the rotatable member.

The improved positioning of the support member allows a maximal radial spacing between the plurality of guides, and easily maintains the disk-shaped objects in a predetermined posture on the support member even when the rotatable member deflects during rotation. As a result, the disk-shaped objects may be dispensed reliably and smoothly over a long period of time, with little possibility of troubles such as the disk-shaped objects becoming caught. Such an apparatus may be manufactured advantageously with an increased freedom of design.

The discharge openings formed by utilizing the positional feature of the support member assure efficient discharge of foreign matters mixed with the disk-shaped objects. This is effective to avoid troubles such as retarded rotation of the rotatable member due to adhesion or intrusion of foreign matters.

Other objects, features and advantages of this invention will be apparent from the following description.

BRIEF DESCRIPTION OF THE INVENTION

The drawings show apparatus for dispensing disk-shaped objects according to this invention, in which FIGS. 1 and 2 are plan views of the dispensing apparatus, FIG. 3 is a view in vertical section of a mounting structure for a rotatable member, FIGS. 4 and 5 are a top plan view and a bottom view of the rotatable member, respectively, FIG. 6 is a view in vertical section showing the way in which the rotatable member rotates, FIG. 7 is a side view of the dispensing apparatus, FIG. 8 is a view in vertical section showing the way in which a rotatable member in another embodiment rotates, FIGS. 9 through 15 are plan views showing different embodiments of this invention, and FIG. 16 is a view in vertical section showing the way in which a rotatable member according to the prior art rotates.

DETAILED DESCRIPTION OF THE PREFERRED EMBODIMENTS

Figure 1:
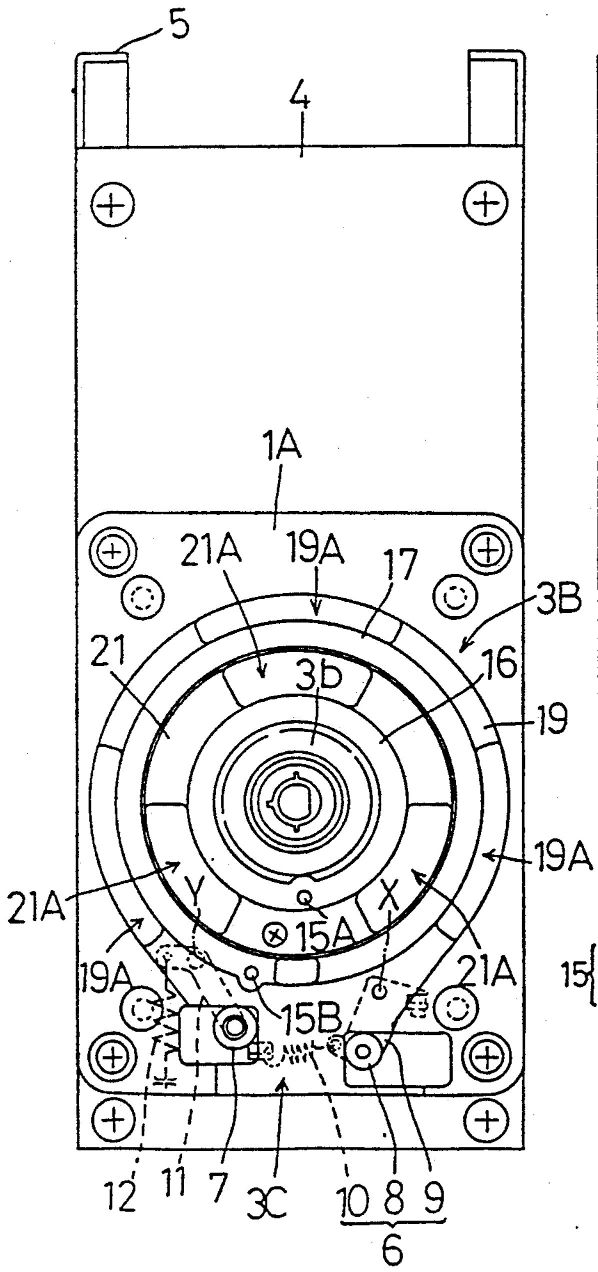
Figure 2:
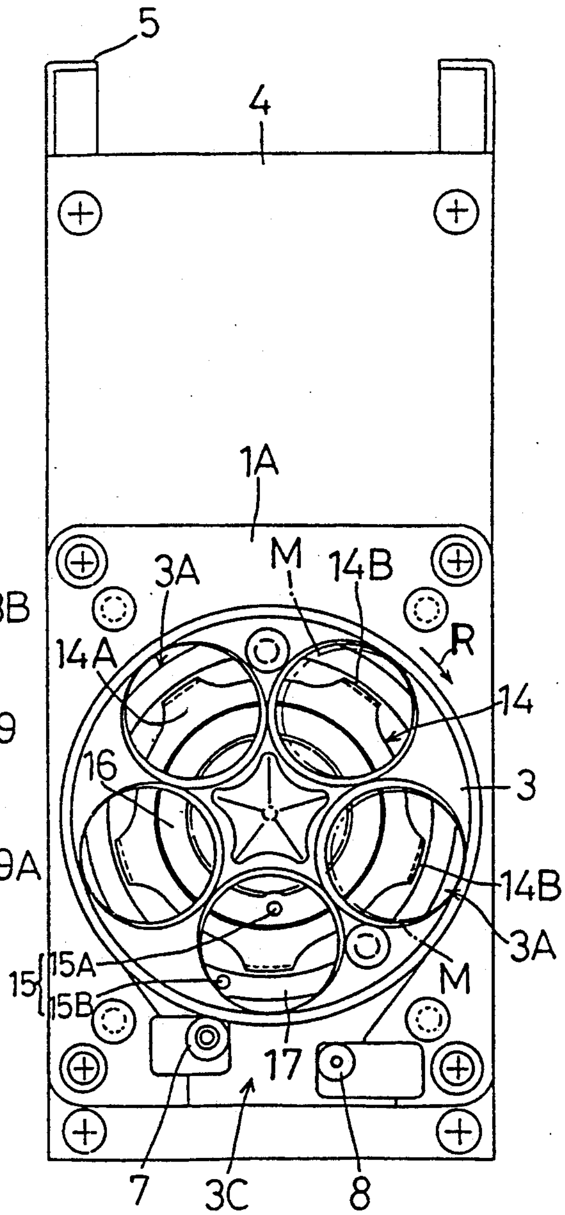
Figure 7:
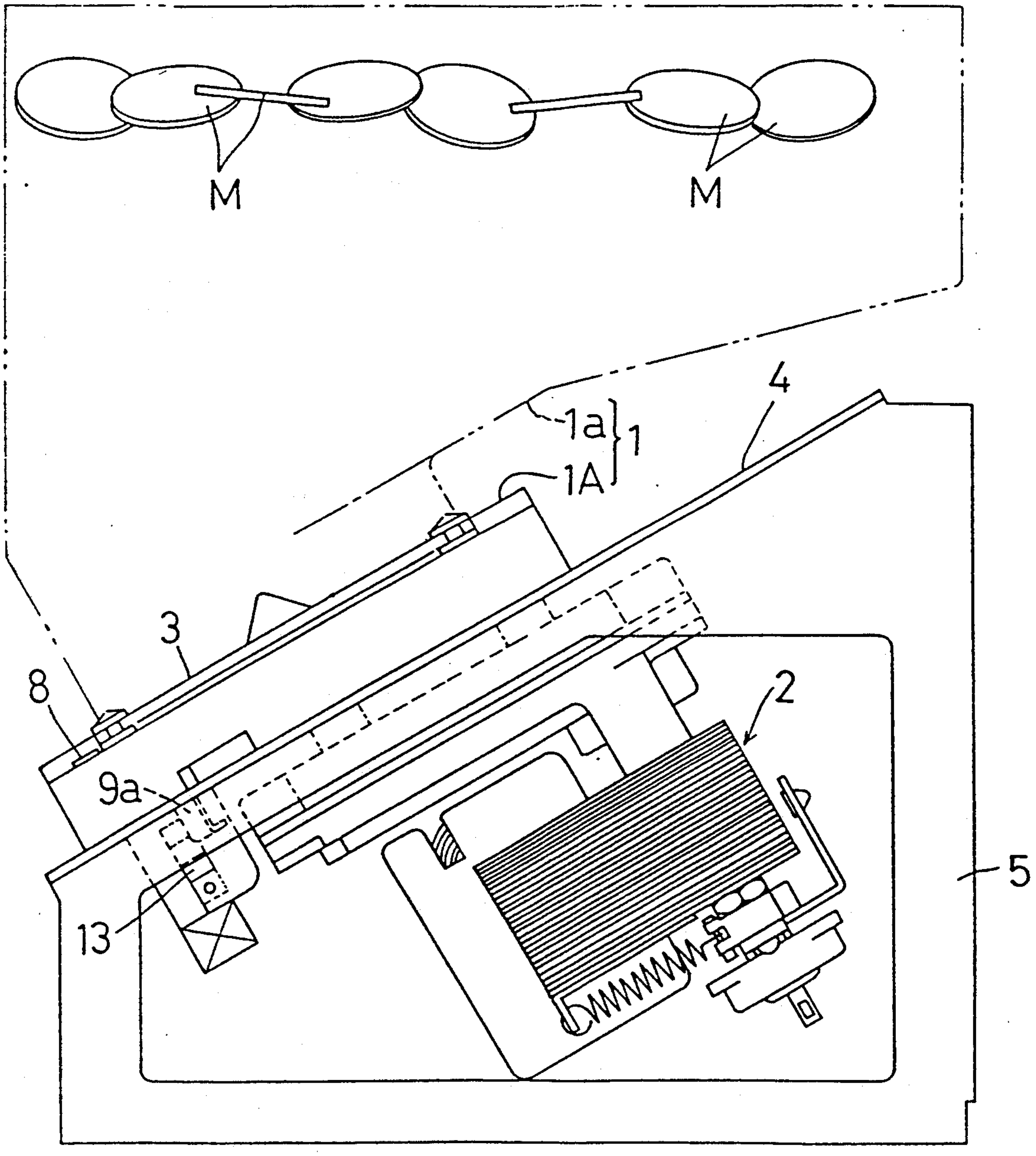

FIGS. 1, 2 and 7 show an apparatus for dispensing medals M which are one example of disk-shaped objects. This apparatus has a bottom plate 1A of a hopper 1 opening upwardly and inclined approximately 30 degrees relative to a horizontal plane. A rotatable member 3 formed of a resin material is mounted on an upper surface of the bottom plate 1A to be driven by an electric motor 2. The rotatable member 3 defines a plurality of perforations 3A arranged at predetermined intervals in a direction of rotation and having a slightly larger diameter than the medals M.

The hopper 1 comprises the bottom plate 1A screwed to a base 4, and a hopper case 1*a* supported by the bottom plate 1A. Numeral 5 in FIG. 7 denotes a supporting block for supporting the dispensing apparatus.

As shown in FIG. 1, the bottom plate 1A includes a circular recess 3B for rotatably receiving the rotatable member 3, and a medal outlet 3C formed laterally outwardly thereof.

An oscillatable counter device 6 is disposed upstream of the medal outlet 3C with respect to the direction of rotation for contacting and counting the medals M delivered by the rotatable member 3. An oscillatable guide roller 7 is disposed downstream of the medal outlet 3C for contacting the medals M delivered by the rotatable member 3 and guiding the medals M outwardly in a direction of turning radius.

The counter device 6 includes a counter roller 8 for contacting the medals M delivered by the rotatable member 3, a counter arm 9 carrying the roller 8 for free rotation and oscillatable on a first axis X extending vertically with respect to the bottom plate 1A, and a first spring 10 extending between the counter arm 9 and base 4 to urge the counter roller 8 to a position for contacting the medals M.

The guide roller 7 is freely rotatably supported by a guide arm 11 attached to the base 4 to be oscillatable on a second axis Y extending parallel to the first axis X. The guide roller 7 is urged by a second sparing 12 toward the rotatable member 3.

Numeral 13 in FIG. 7 denotes a gate type photoelectric sensor for detecting passage of a counter portion 9*a* continuous with a free end of the oscillatable counter arm 9.

The rotatable member 3 includes a support member 14 formed integral therewith for supporting parts of the medals M lodged in the perforations 3A. The rotatable member 3 is rotatable to transport the medals M lodged in the perforations 3A and supported by the support member 14.

The support member 14 is disposed in an intermediate position in the direction of turning radius within an annular range of movement of the perforations 3A defined in the rotatable member 3. This allows two pin-like guides 15A and 15B, which will be described later, to be arranged in radially opposed positions across the support member 14.

The support member 14 includes portions each extending radially outwardly from an intermediate position 14A of an arcuate section exposed to the perforation 3A. These extending portions stably support the medals M lodged in the perforations 3A.

The bottom plate 1A of the hopper 1 includes a guide device 15 for guiding, outwardly of the rotatable member 3, the medals M in the perforations 3A transported under pressure with the rotation of the rotatable member 3. The guide device 15 includes the pin-like guides 15A and 15B arranged within the annular range of movement of the perforations 3A and at opposite sides in the direction of turning radius of the support member 14.

Specifically, the circular recess 3B includes two annular medal contacting and guiding projections 16 and 17 disposed at opposite sides in the direction of turning radius of the support member 14 for slidably contacting side faces of the medals M supported by the support member 14. The pin-like guides 15A and 15B are fitted in the guiding projections 16 and 17 adjacent the medal outlet 3C, respectively. The pin-like guide 15B is located radially outwardly of the pin-like guide 15A, and downstream of the latter with respect to the direction of rotation.

Figure 3:
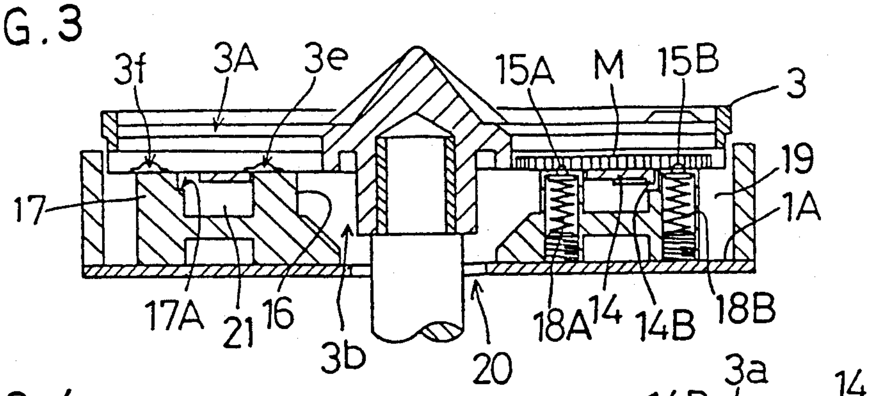
Figure 4:
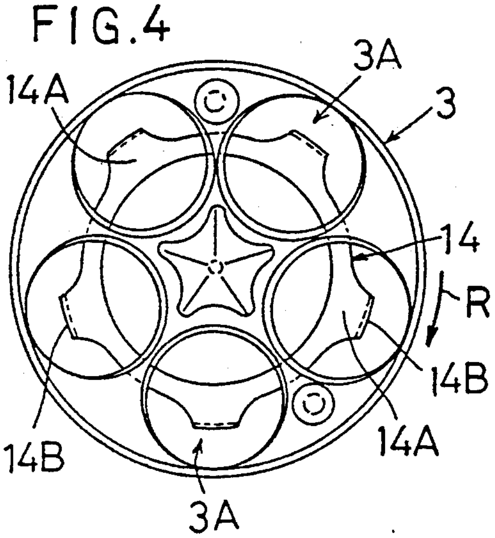

As shown in FIG. 3, each of the pin-like guides 15A and 15B is movable between a position projecting upwardly from a medal contacting and guiding surface of the guiding projection 16 or 17, and a position retracted inwardly of the guiding projection 16 or 17. The pin-like guides 15A and 15B are urged toward the upwardly projecting position by springs 18A and 18B, respectively.

Thus, when the medals M transported by the rotatable member 3 are caught between one of the pin-like guides 15A or 15B and the rotatable member 3, the rotation of the rotatable member 3 causes the medals M to mount the pin-like guides 15A or 15B while depressing the latter, whereby the medals M become released.

The bottom plate 1A of the hopper 1 defines a peripheral groove 19 opposed to an outer periphery of the rotatable member 3 radially outwardly of the perforations 3A, i.e. at an outermost position of the circular recess 3B, for allowing foreign matters mixed with the medals M, such as abrasion chips and dust, to fall downwardly of the rotatable member 3. The peripheral groove 19 includes a plurality of discharge openings 19A for discharging the foreign matters having fallen into the peripheral groove 19.

The circular recess 3B includes a small recess *3b* formed at an innermost position thereof, which includes a discharge opening 20 for discharging the foreign matters downwardly. The two guiding projections 16 and 17 define a peripheral groove 21 therebetween, which includes a plurality of discharge openings 21A for discharging the foreign matters downwardly.

Thus, the foreign matters lodged in radially inward positions in the perforations 3A are discharged outwardly through the opening 20 in the small recess *3b*. The foreign matters lodged in radially intermediate positions in the perforations 3A are discharged downwardly through the peripheral groove 21 defined between the support member 14 and the outer guiding projection 17 and out through the openings 21A. The foreign matters lodged in radially outward positions in the perforations 3A and those moved radially outwardly in the perforations 3A by centrifugal forces are allowed to fall into the peripheral groove 19 and discharged through the openings 19A.

The outer guiding projection 17 includes a support portion 17A defined on an inner peripheral wall thereof. When the rotatable member 3 deflects in its rotation, the support portion 17A slidably contacts and guides a plurality of downward projections formed on lower surfaces of the support member 14.

Figure 5:
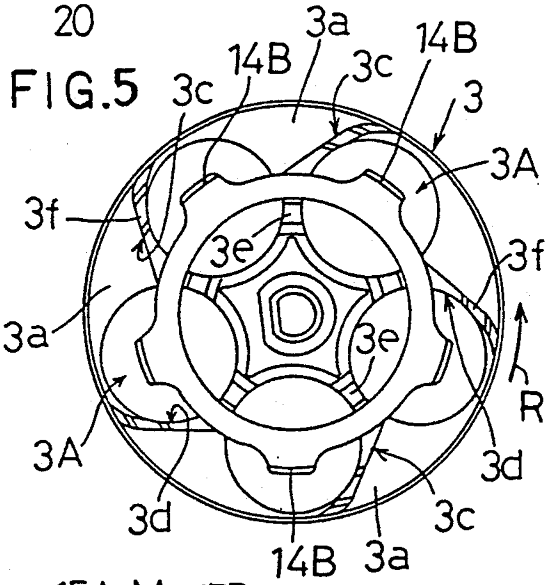
Figure 6:
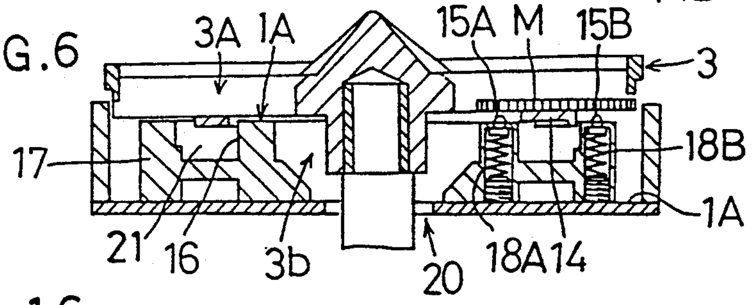
Figure 16:
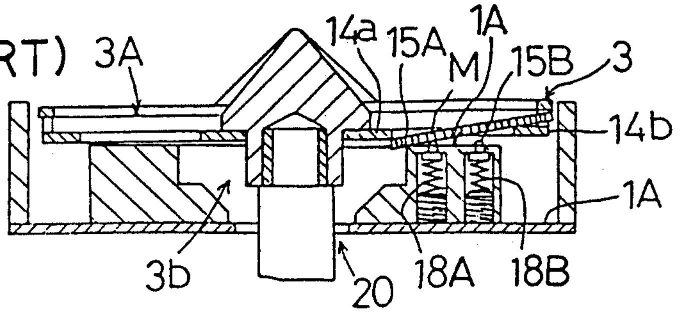
FIG.16 (PRIOR ART)

As shown in FIG. 5, the rotatable member 3 includes delivery grooves *3a* formed on lower surfaces thereof for delivering the medals M lodged in the perforations 3A radially outwardly toward the medal outlet 3C.

Each of the delivery grooves *3a* is defined between wall surfaces 3*c* and 3*d*, the wall surface 3*d* being downstream of the wall surface 3*c* with respect to the direction of rotation of the rotatable member 3. The downstream wall surface 3*d* receives the medal M lodged in the perforation 3A, and guides the medal M along a predetermined path of rotation. The upstream wall surface 3*c* acts to push the medal M radially outwardly. Numerals 3*e* and 3*f* in FIG. 5 denote pass grooves for allowing relative rotation between the rotatable member 3 and pin-like guides 15A and 15B.

(I) In the foregoing embodiment, the bottom plate 1A of the hopper 1 defines the peripheral groove 19 opposed to the outer periphery of the rotatable member 3 radially outwardly of the perforations 3A. Instead of providing the peripheral groove 19, the outer guiding projection 17 may be extended to the outer periphery of the circular recess 3B defined in the bottom plate 1A.

Figure 8:
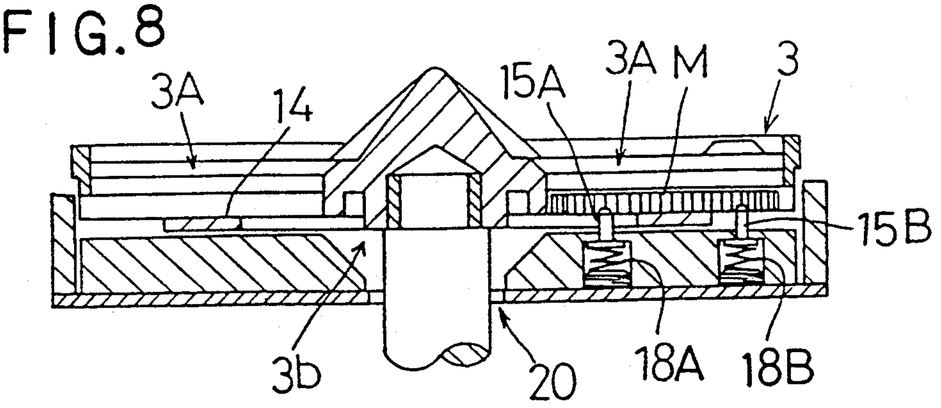

(II) In the foregoing embodiment, the circular recess 3B of the bottom plate 1A includes the guiding projections 16 and 17 for slidably contacting side faces of the medals M supported by the support member 14. However, these guiding projections 16 and 17 may be omitted as shown in FIG. 8.

Figure 9:
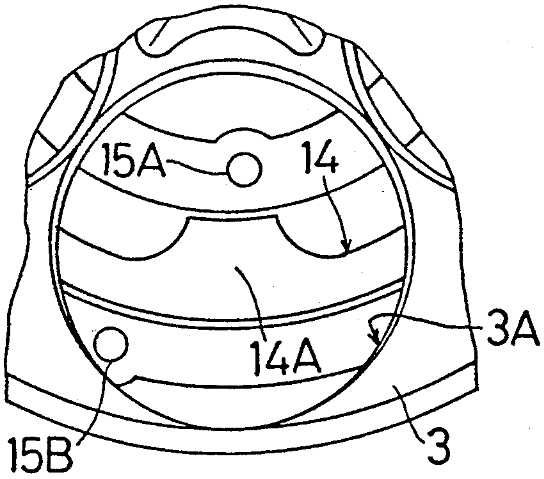
Figure 10:
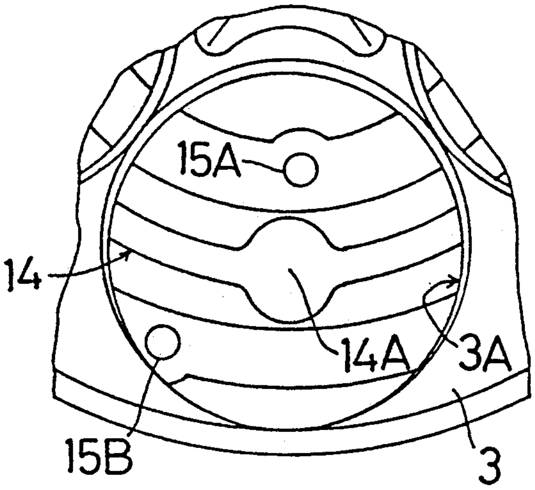

(III) In the foregoing embodiment, the support member 14 includes, as means for stably supporting the medals M in the perforations 3A, portions each extending radially outwardly from the intermediate position 14A of an arcuate section exposed to the perforation 3A. However, as shown in FIG. 9, the intermediate position 14A of each arcuate section may be projected radially inwardly. As shown in FIG. 10, the intermediate position 14A of each arcuate section may be projected radially inwardly and outwardly.

Figure 11:
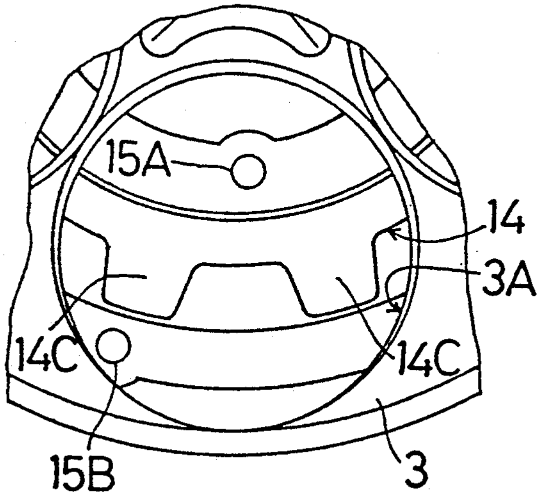

Further, as shown in FIG. 11, each arcuate section of the support member 14 exposed to the perforation 3A may include two radially outward projections 14C arranged at a suitable interval in the direction of rotation.

Figure 12:
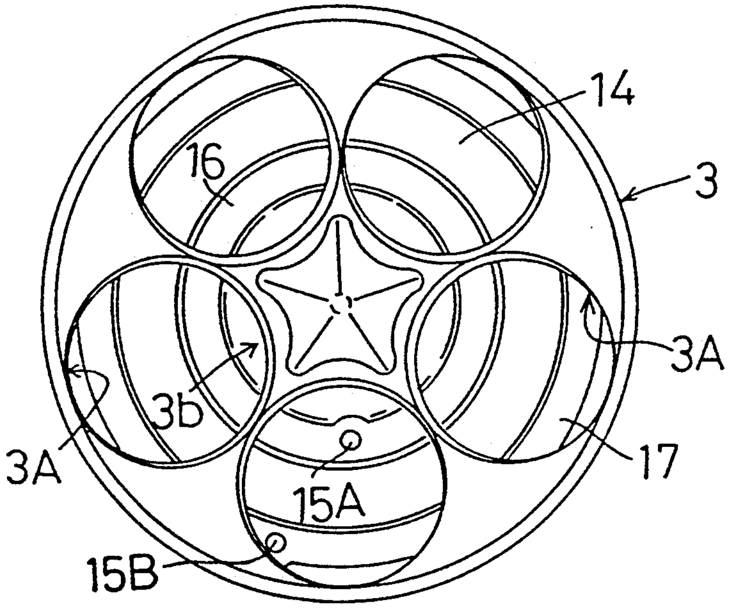

Still further, as shown in FIG. 12, the support member 14 may comprise an annular element including no radial projections.

In other words, the shape of the support member 14 is freely variable to suit different conditions.

Figure 13:
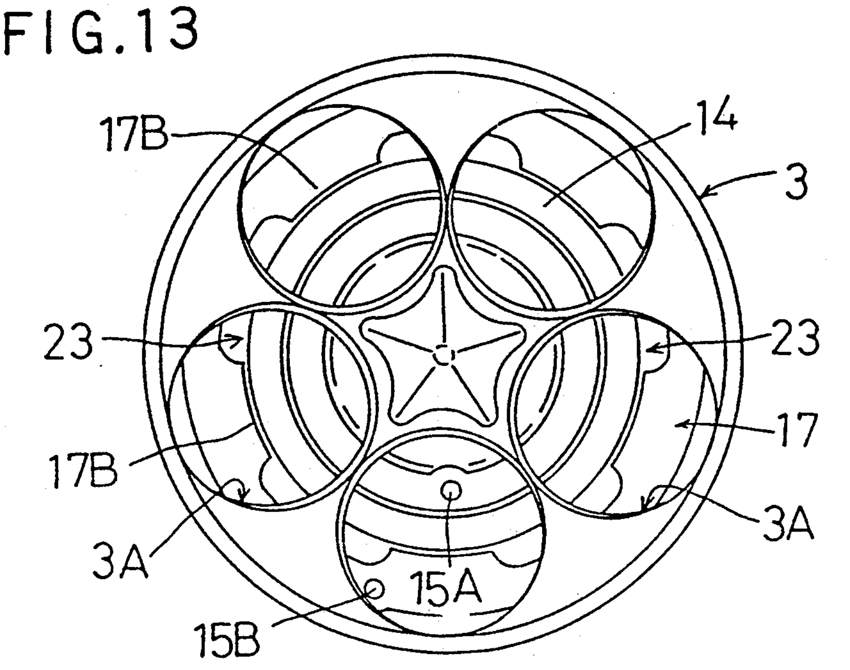

(IV) Various devices are conceivable for discharging foreign matters. As shown in FIG. 13, for example, the outer guiding projection 17 adjacent the support member 14 may include inward projections 17B to define openings 23 between the guiding projection 17 and support member 14 for downwardly discharging the foreign matters.

Figure 14:
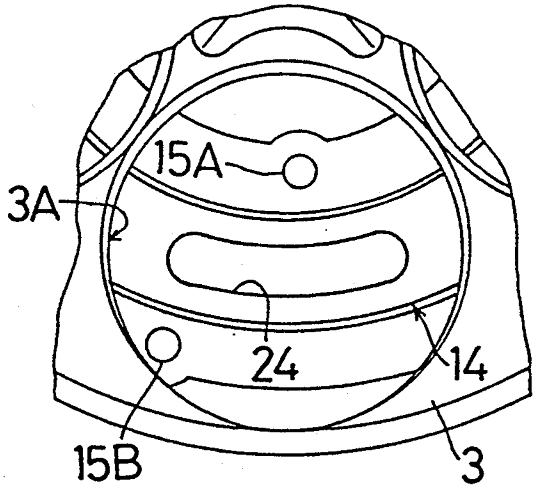

As shown in FIG. 14, a foreign matter discharge opening 24 may be formed in each arcuate section of the support member 14 exposed to the perforation 3A.

(V) In the foregoing embodiment, the guide device 15 comprises two pin-like guides 15A and 15B. The guide device 15 may comprise three or more pin-like or plate-like guides.

Figure 15:
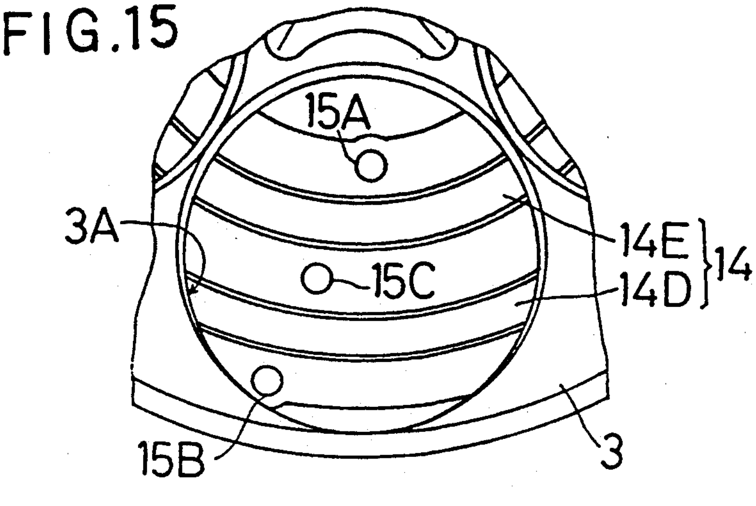

As shown in FIG. 15, for example, the support member 14 may include annular elements 14D and 14E of different diameters, with three pin-like guides 15A, 15B and 15C being provided inwardly of the inner annular element 14E, outwardly of the outer annular element 14D, and between the two annular elements 14D and 14E.

Thus, the shape and number of guides constituting the guide device 15 are freely variable to suit different conditions.

(VI) In the foregoing embodiment, the circular perforations 3A are formed peripherally of the rotatable member 3. These perforations 3A may be replaced by approximately U-shaped cutouts opening radially outwardly.

(VII) In the foregoing embodiment, the bottom plate 1A of the hopper 1 is inclined approximately 30 degrees relative to a horizontal plane. This angle of inclination is variable as desired. The bottom plate 1A may be disposed substantially horizontal to deliver the medals M substantially horizontally.

(VIII) In the foregoing embodiment, the support member 14 and rotatable member 3 are formed integral with each other. However, these components may comprise separate entities.

(IX) The technical features of this invention are applicable to apparatus for dispensing various disk-shaped objects such as coins, in addition to the apparatus for dispensing medals as described.

What is claimed is:

1. An apparatus for dispensing disk-shaped objects, comprising;

a hopper for storing a multiplicity of disk-shaped objects, a rotatable member mounted on a bottom of said hopper and defining a plurality of perforations or cutouts arranged at predetermined intervals peripherally thereof and having a slightly larger diameter than said disk-shaped objects, a support member rotatable with said rotatable member for supporting parts of the disk-shaped objects lodged in said perforations or cutouts of said rotatable member, and a guide device provided on the bottom of said hopper for moving and guiding, outwardly of a turning radius, the disk-shaped objects lodged in said perforations or cutouts and transported with rotation of said rotatable member, wherein said support member is disposed at a radially intermediate position in an annular moving range of said perforations or cutouts defined in said rotatable member, and said guide device includes a plurality of guides arranged in a direction of turning radius of said rotatable member, said guides being arranged within the annular moving range of said perforations or cutouts and at opposite sides in the direction of turning radius of said support member.

2. An apparatus as claimed in claim 1, wherein the bottom of said hopper defines discharge openings arranged radially outwardly of the annular moving range of said perforations or cutouts for discharging foreign matters mixed with said disk-shaped objects.

3. An apparatus as claimed in claim 1, wherein said guides are attached to disk-shaped object contacting and guiding projections formed on the bottom of said hopper, one of said guides being disposed radially outwardly and downstream, with respect to a direction of rotation of said rotatable member, of the other guide.

4. An apparatus as claimed in claim 3, wherein each of said guides is movable between a position projecting upwardly from a medal contacting and guiding surface of the guiding projection and a position retracted inwardly of the guiding projection.

5. An apparatus as claimed in claim 3, wherein said medal contacting and guiding projections are formed concentrically with each other to define a peripheral groove therebetween, said peripheral groove including discharge openings for downwardly discharging foreign matters.

6. An apparatus as claimed in claim 1, wherein the bottom of said hopper is inclined approximately 30 degrees relative to a horizontal plane.

7. An apparatus as claimed in claim 1, wherein said support member includes arcuate sections exposed to said perforations or cutouts, each of said arcuate sections having an intermediate position thereof extending radially outwardly.

* * * * *